US 8,661,778 B2

(12) United States Patent
Bronicki et al.

(10) Patent No.: US 8,661,778 B2
(45) Date of Patent: Mar. 4, 2014

(54) SOLAR POWER PLANT

(75) Inventors: Lucien Y. Bronicki, Yavne (IL); Joseph Sinai, Or-Yehuda (IL)

(73) Assignee: Ormat Technologies, Inc., Reno, NV (US)

( * ) Notice: Subject to any disclaimer, the term of this patent is extended or adjusted under 35 U.S.C. 154(b) by 0 days.

(21) Appl. No.: 13/371,816

(22) Filed: Feb. 13, 2012

(65) Prior Publication Data

US 2013/0207402 A1  Aug. 15, 2013

(51) Int. Cl.
*F02C 6/00* (2006.01)
*F03G 6/00* (2006.01)

(52) U.S. Cl.
USPC .............. 60/39.182; 60/641.12; 60/641.14; 60/641.15; 60/655

(58) Field of Classification Search
USPC ............ 60/39.01, 39.182, 641.8–641.15, 655
See application file for complete search history.

(56) References Cited

U.S. PATENT DOCUMENTS

| 4,095,118 A * | 6/1978 | Rathbun ...................... 290/2 |
| 4,394,814 A * | 7/1983 | Wardman et al. ........... 60/641.15 |
| 6,237,337 B1 * | 5/2001 | Bronicki et al. ............ 60/641.12 |
| 7,299,638 B2 * | 11/2007 | MacKay .................... 60/784 |
| 2012/0204565 A1 * | 8/2012 | Brooks ...................... 60/641.15 |
| 2012/0216536 A1 * | 8/2012 | Ma et al. .................... 60/641.8 |

OTHER PUBLICATIONS

International Search Report issued Jun. 5, 2013 in PCT/IB13/00171.

* cited by examiner

Primary Examiner — Hoang Nguyen
(74) Attorney, Agent, or Firm — Oblon, Spivak, McClelland, Maier & Neustadt, L.L.P.

(57) ABSTRACT

A solar power plant in a new split configuration of a solar Brayton cycle or Brayton/Rankine combined cycle which comprises an array of heliostat mounted mirrors, a solar receiver and a high pressure section of a Brayton cycle power plant mounted near a top of a solar tower, a low pressure section of the Brayton Cycle power plant and the electric generator mounted near or at ground level.

32 Claims, 8 Drawing Sheets

CYLINDRICAL   FLAT

2 TYPES OF RECEIVERS

FIG 3

ELECTRIC STARTER
FIG 4

AIR START BY-PASS ON HPC
FIG 5

SOLAR POWER PLANT

FIELD

The present invention relates to the field of solar energy. More particularly, the invention relates to an improved Brayton cycle configuration for optimizing utilization of solar energy.

BACKGROUND

Currently most of the world's commercially available solar thermal electric power is by systems using parabolic trough solar collectors. Another approach is the central receiver or power tower technology. This is based on the concept of many flat two-axis sun tracking mirrors (heliostats) that reflect the beam radiation to a common focal zone. The focal zone is placed well above the heliostat field, on a central tower. This is to help prevent interference between the reflected radiation and the other heliostats. A solar receivers array at the focal zone absorbs the concentrated radiation, converting it to heat. However, these systems are all Rankine steam cycles converting the delivered solar thermal energy with a maximum efficiency of 30 to 39%. Today modern gas turbine systems achieve efficiencies between 40 and 58% when operated in single cycle or as combined cycle plants. Combining solar energy and gas turbine technologies allows conversion of the solar energy into electricity at substantially increased efficiency as compared with the parabolic trough system. In turn, as the collector field is the major part of the solar system investment, it allows for the reduction of the solar collector area by the same amount to achieve a given solar share. The result is a substantial cost reduction of solar electricity.

Adapting a gas turbine to high temperature solar receivers and solar tower technology constitutes genuine progress towards commercial solar power utilization with high efficiency in the combined cycle power system. Solar gas turbine systems can also be adapted to hybrid solar/fossil fuel operation, due to its high efficiency conversion, relatively small solar field, quick response to load fluctuations, low $CO_2$ emissions and more effective equipment utilization.

With respect to prior art solar towers having a height in the order of 100 m, a plurality of heliostats acting as solar collectors automatically track sunlight and concentrate the solar radiation onto a central receiver at the top of a tower to power a turbine.

Air is one medium that is used to extract the concentrated solar energy from the central receiver. In an open Brayton Cycle, air is compressed by the compressor to increase its pressure. The compressed air is delivered to the central receiver and heated to a high temperature. This hot air is then passed from the central receiver to the turbine where it expands, causing the turbine rotation, driving the generator to produce electricity as well as the compressor to compress the supplied air. The air exiting the turbine is exhausted to the surrounding ambient air.

The compressor, turbine and generator used in conjunction with the Brayton Cycle are all mounted on top of the tower. Since these components are especially heavy, the capacity of the power plant has to be limited to lower the weight of compressor, turbine and generator mounted on top of the tower, thereby ensuring structural integrity of the tower. Alternatively the solar tower would have to be immense and expensive to manufacture and assemble if a large sized compressor and turbogenerator were mounted on the tower.

The present invention advantageously provides a power plant comprising of a Brayton cycle associated with a solar tower superior to that of the prior art.

Furthermore, the present invention advantageously provides a Brayton cycle power plant which is less sensitive to intermittent cloudiness. Additionally, the present invention provides a power plant based on a solar tower that is cost effective and economical by using lighter and cheaper such as wind power plant type towers.

Other advantages of the invention will become apparent as the description proceeds.

SUMMARY

The present invention provides a new configuration of a Brayton cycle solar power plant comprising an array of heliostat mounted mirrors, a solar receiver and a high pressure section of the Brayton cycle power plant mounted near a top of a solar tower, a low pressure section of said Brayton Cycle power plant and an electric generator mounted near or at ground level. It is advantageous that the high pressure section of the Brayton Cycle power plant mounted near the top of said solar tower is located adjacent to the solar receiver.

By mounting only the relatively light high speed, high pressure section of the plant near the top of the solar tower, the same MW output the solar tower can be less heavy than those of a prior art solar towers of the same height, enabling a correspondingly higher capacity power plant without sacrificing structural integrity of the solar tower due to lower weight demands.

BRIEF DESCRIPTION OF THE DRAWINGS

In the drawings.

Similar reference numerals or characters refer to similar components.

DETAILED DESCRIPTION

The Brayton Cycle based solar power plant of the present invention is divided into two sections. The heavy components of a first section including a low pressure compressor (LPC) and a low pressure gas turbine turbogenerator (LPT), positioned near, or at, a ground level. The relatively lighter components of the power plant, including a high pressure compressor (HPC) and high pressure gas turbine (HPT) mounted in a second section on top of a solar tower also holding a solar receiver, for producing power from the solar heated air. Thus, the present solar power plant comprises a split Brayton cycle wherein the low pressure section comprises a low pressure compressor (LPC) and a low pressure turbine (LPT) driving said low pressure compressor and generator, and the high pressure section comprises a high pressure compressor (HPC) and a high pressure gas turbine (HPT). The solar tower is then able to be constructed of lighter materials than those of a prior art solar tower, to enable a correspondingly higher capacity power plant without sacrificing structural integrity of the solar tower due to the lower weight demands.

Figure 1:
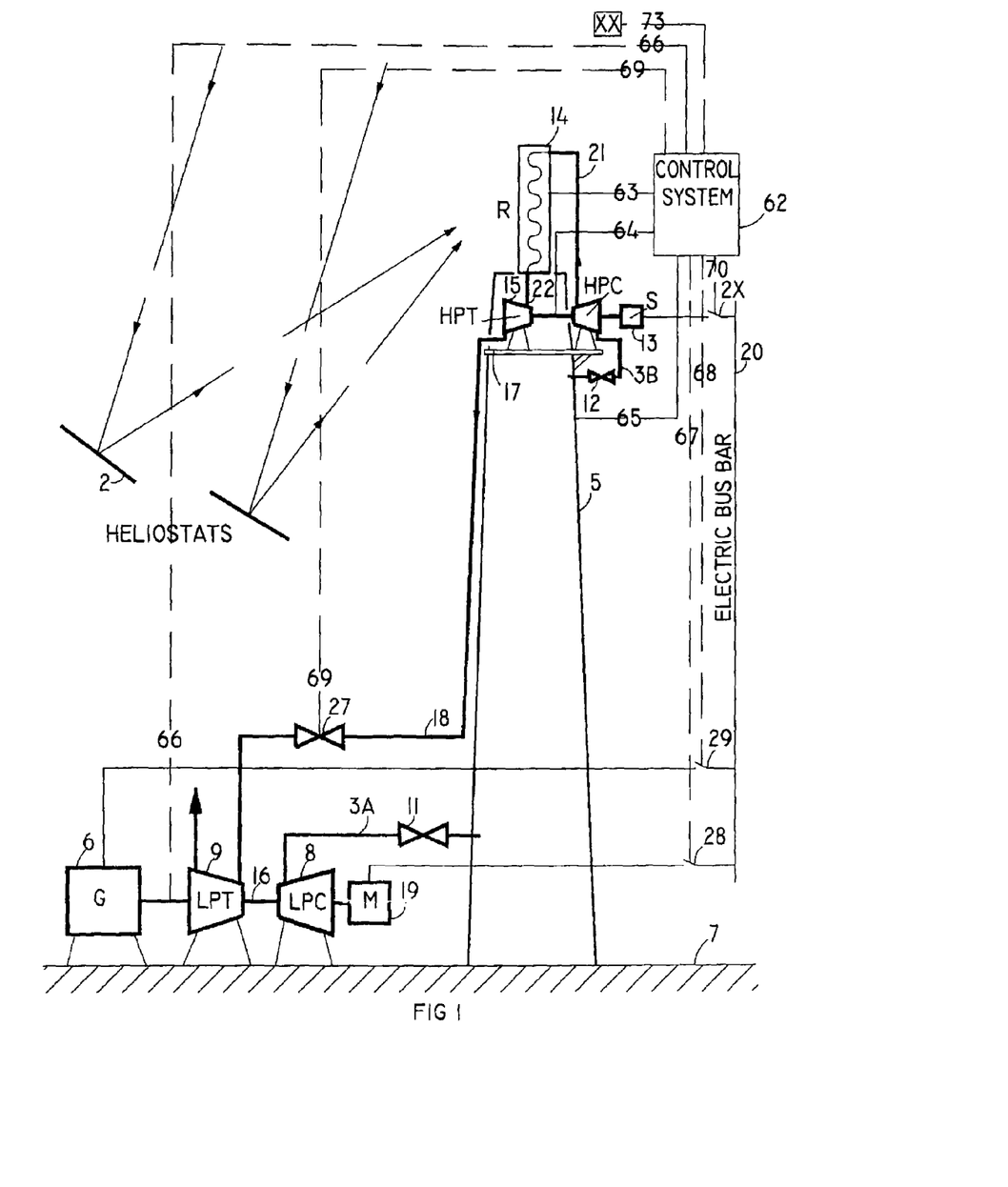
FIG. 1 is a schematic front view of a solar tower, showing the relative location of a first lower section and a second upper section of a solar power plant according to one embodiment of the present invention.

The deployment of the two power plant sections with respect to solar tower 5 is schematically illustrated in FIG. 1. Solar power plant 10 comprises a first lower section 7 and a second upper section 17. The relatively heavy components of first section 7 comprising LPC 8 and LPT 9, which may be physically and thermally separated from each other, are positioned in the vicinity of ground level G. Alternatively, LPC 8 and LPT 9 are coaxial, or connected together by means of a coupling, so that shaft 16 will transmit the rotary motion of LPT 9 to LPC 8 which drives electric generator GEN 6. On the same shaft there is starter (D) 19 which can be an electric motor, an internal combustion (IC) engine or a pneumatic motor. Alternatively, LPT 9 can drive electric generator only GEN 6 and LPC 8 can be driven separately by an electric motor with a VFD (D) 19 instead of shaft 16. The relatively light components of second section 17, including HPC 13, an array of solar receivers 14, and HPT 15, are mounted onto solar tower 5, in the vicinity of top T.

An array of passive solar receivers 14, which may be configured as any element well known to those accomplished in the art, are mounted on the outer face of solar tower 5, preferably along the entire sun facing portions near top T of the solar tower periphery. The height of solar tower 5 is sufficiently great, e.g. a height of approximately 60-70 m or more so that receivers 14 will be positioned substantially above all surrounding structures and landscape elements without suffering obstruction or shading, so as to optimize the influx of solar energy onto receivers 14.

Furthermore, the array of solar receivers 14 is a central receiver onto which concentrated solar radiation (SR) 1 from a plurality of mirrors mounted on heliostats 2 is concentrated, the heliostats tracking the sun for maintaining the concentrated solar radiation focused on the receiver (R) 14 during the day so that minimal shade pattern is produced on a neighboring receiver.

Solar tower 5 is shown to be conical tubular type; however, this is a non-limiting example, and may be configured in numerous ways. Solar tower 5 may be a conventional wind tower made of steel to lower costs. The solar receivers 14 and HPT 15 and HPC 13 can be located near the top T of the solar tower 5 since they are of similar weight as a wind rotor, gear and generator. However their use enables power production without the impact of the bending moment of a mounted wind turbine and producing more power for the same weight thus reducing installation costs of the solar tower.

Ambient air is compressed in a first stage to an increased pressure and temperature by the low pressure compressor LPC 8, while the internal volume of solar tower 5 serves as a storage/buffer between LPC 8 and HPC 13, as well as acting as an intercooler partially cooling the upwardly flowing compressed air thereby improving the efficiency of the high pressure compressor. Due to contact of the upwardly rising pressurized air via the external envelope of solar tower 5 with external cooler air, the thermal efficiency of power plant 10 increases without the need of an additional intercooler. Alternatively or in addition, the compressed air that flows upwardly through line 3 to HPC 13 may be further cooled by an intercooler mounted on top of the tower and exposed to wind. In a second stage, the high pressure compressor, HPC 13 further increases the pressure of the air delivering it to the array of receivers 14. The air exiting the array of receivers 14 at a peak temperature and pressure is delivered to HPT 15. HPT 15 is located adjacent to the exit of the array of receivers 14, so the solar heated air will not be subject to pressure losses and thus aid to maximize the power output of HPT 15. In HPT 15, the solar heated air is expanded to produce power for driving compressor HPC 13. The lower temperature and pressure air discharged from HPT 15 is supplied through insulated conduit 18 to LPT 9, where it is further expanded to produce power for driving the generator and LPC.

Both HPC 13 and HPT 15 are preferably mounted adjacent to the receiver 14 in the vicinity of the top tower thus minimizing pressure losses and maximizing the output of HPT 15. Conduit 21 connecting HPC 13 to solar array of receivers 14 and conduit 22 connecting array of receivers 14 to HPT 15 are both insulated.

Conduit 3 may be provided with valve 11 for short period isolation of the LPC. The HPC is provided with compressed air from the storage in the tower. The power not used by LPC is then delivered to the LPT minimizing power loss of the plant during short cloud covering.

Additionally, conduit 3 may be provided with valve 11 to isolate the compressed air during periods of low solar influx, such as diminished sunlight, sunset or during longer cloudy periods when power output is very small, the controller may automatically close valves 11 and 12 and deactivate the motor (M) which drives LPC 8. Thus, the compressed air isolated or trapped between valves 11 and 12 allows power plant 10 to maintain the stored pressure and enable restarting HPC 13 and LPT 9 and the entire cycle immediately upon resumption of the solar radiation. When the solar influx rapidly increases, such as at a predetermined time or upon detection by means of a sensor, valve 12 is opened and the compressed air becomes immediately available to HPC 13 and LPT 9 and motor M of compressor LPC is activated. Valve 11 is then opened and HPC 13 and LPT 9 are activated.

Figure 2:
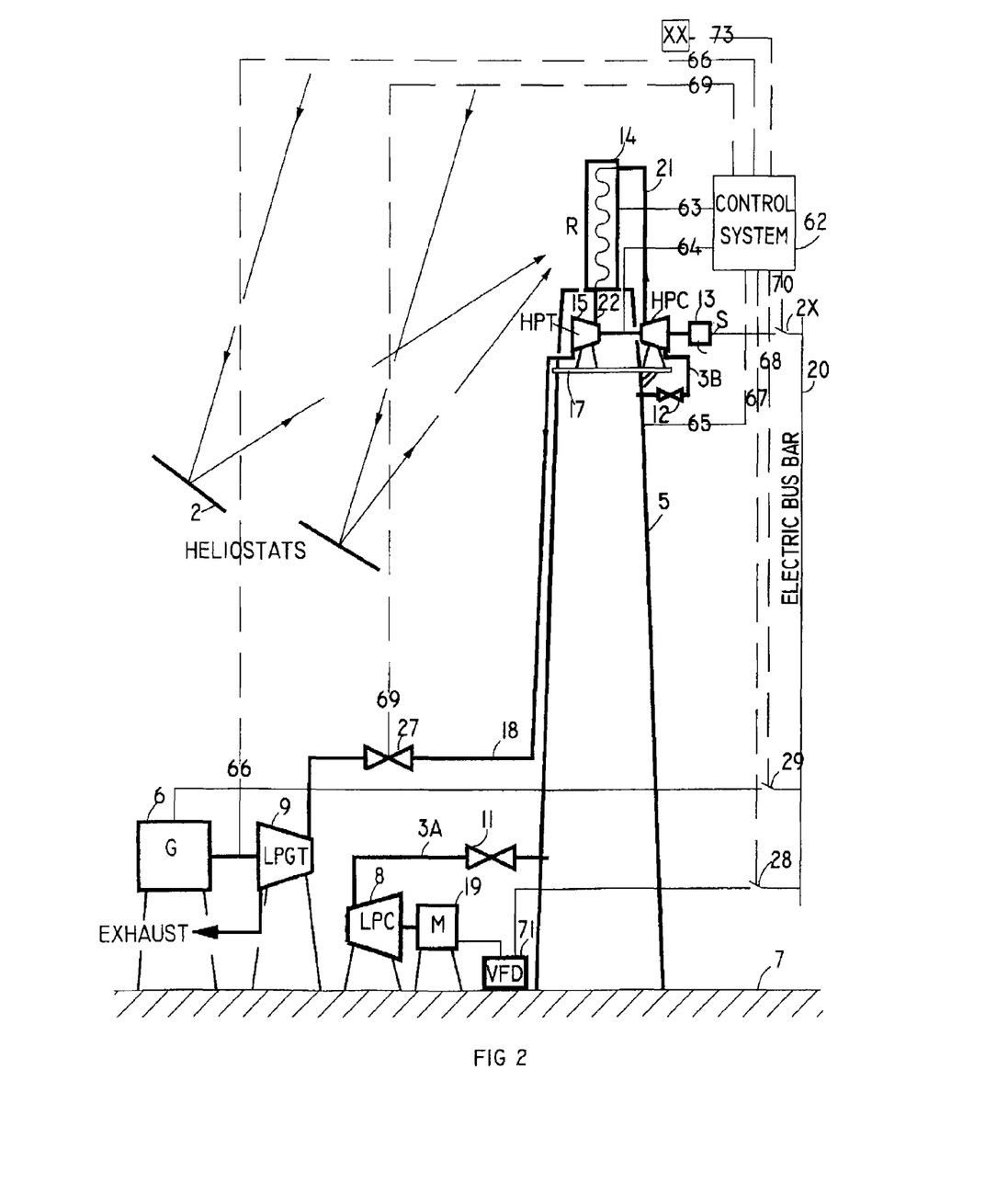
FIG. 2 is another embodiment of the low pressure compressor is driven by a variable speed electric motor fed by a variable frequency drive (VFD)

In addition to increasing the power output of plant 10 by mounting only the relatively light components of section 17 in the vicinity of the solar tower top (enabling a larger sized solar tower construction as explained above), permits simplified compressor and turbine speed control. In the prior art, all power plant components were mounted in the vicinity of the solar tower top. Here, only the HPT 17 and HPC 13 operate at a speed greatly exceeding the synchronous speed thus permitting a relatively light and small sized turbine to be used which minimizes the weight to be supported by the tower and thereby the tower cost. The heavy LPC 8 and LPT 9 of the present invention which are installed at near ground level operate at near synchronous speeds of e.g. 3600 RPM or 3000 RPM. FIG. 2 schematically illustrates power plant 4 where the LPC is not coupled to the LPT 9. LPC is operated by a variable speed motor M 19 driven by a variable speed drive VFD 71 from the generator. For start up, the power to the VFD is supplied by the grid or by a black start diesel generator. This configuration allows more flexible and efficient operation of the plant in variable solar radiation conditions by adjusting the density of the air in the whole system. This is achieved by controller 62 using inputs: input radiation 73, air pressure 65, HPC speed 64 and receiver temperature 63 from power output 74.

Figure 3:
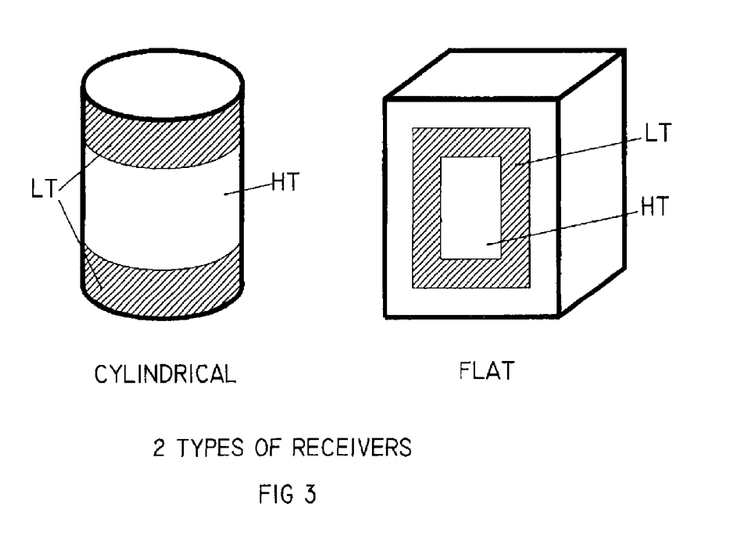
FIG. 3 is a schematic illustration of an exemplary array of solar receivers, showing an arrangement of conduits extending to and from a high pressure turbine.

FIG. 3 illustrates arrangements of an array of solar receivers 14 which are exposed to solar radiation SR with high and low temperature sections. For optical reasons, the solar radiation is more concentrated in the center of the receiver. Thus, it is advantageous to split the array such that, on the periphery, elements of the array which operate at lower temperature are located, while, in the center, the high temperature elements which are made from expensive high temperature resistant alloys are present. Array 14 comprises three receivers $R_{1-3}$. Any other number and any other arrangement can also be provided. Pressurized air exiting HPC 13 is supplied through line 21, which branches into lines 25 and 26 that lead to receivers $R_1$ and $R_3$, respectively. Although only one line is shown leading to each receiver, the pressurized air can also be supplied through a plurality of lines to each receiver. The solar heated air exiting receivers $R_1$ is directed to receiver $R_2$ via lines 28 and 29, respectively, and is further heated. Since the air within receiver $R_2$ can achieve relatively high temperatures exceeding e.g. 800° C., this receiver may be made of a high temperature resistant alloy, to avoid thermal damage to the receiver structure. In order to reduce costs, the relatively expensive high temperature resistant alloy can be integrated in only those specific regions of the receiver structure that operate at higher temperatures.

Figure 4:
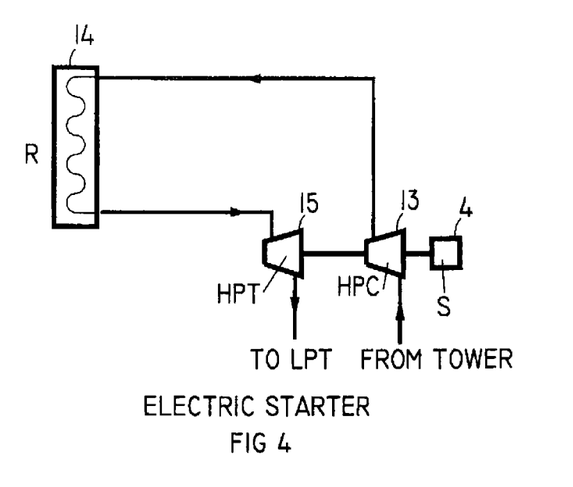
FIG. 4 shows the electric starter of the HPC and HPT.

FIG. 4 shows the electrically driven starter S 4 used to start compressor (HTC) 13 coupled to HPT 15.

Figure 5:
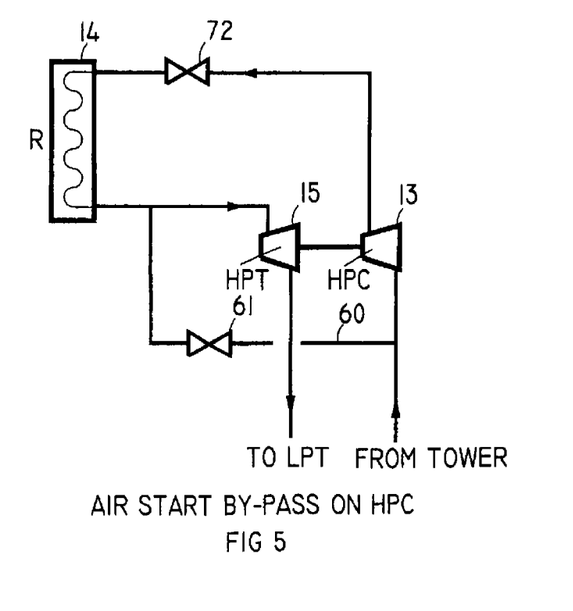
FIG. 5 shows a compressed air start-up of the HPC and HPT.

FIG. 5 shows an alternative where compressor 13 is started using the air under pressure in tower 5 to start the turbine by bypassing receiver 14 by means of valves 61 and 72.

Figure 6:
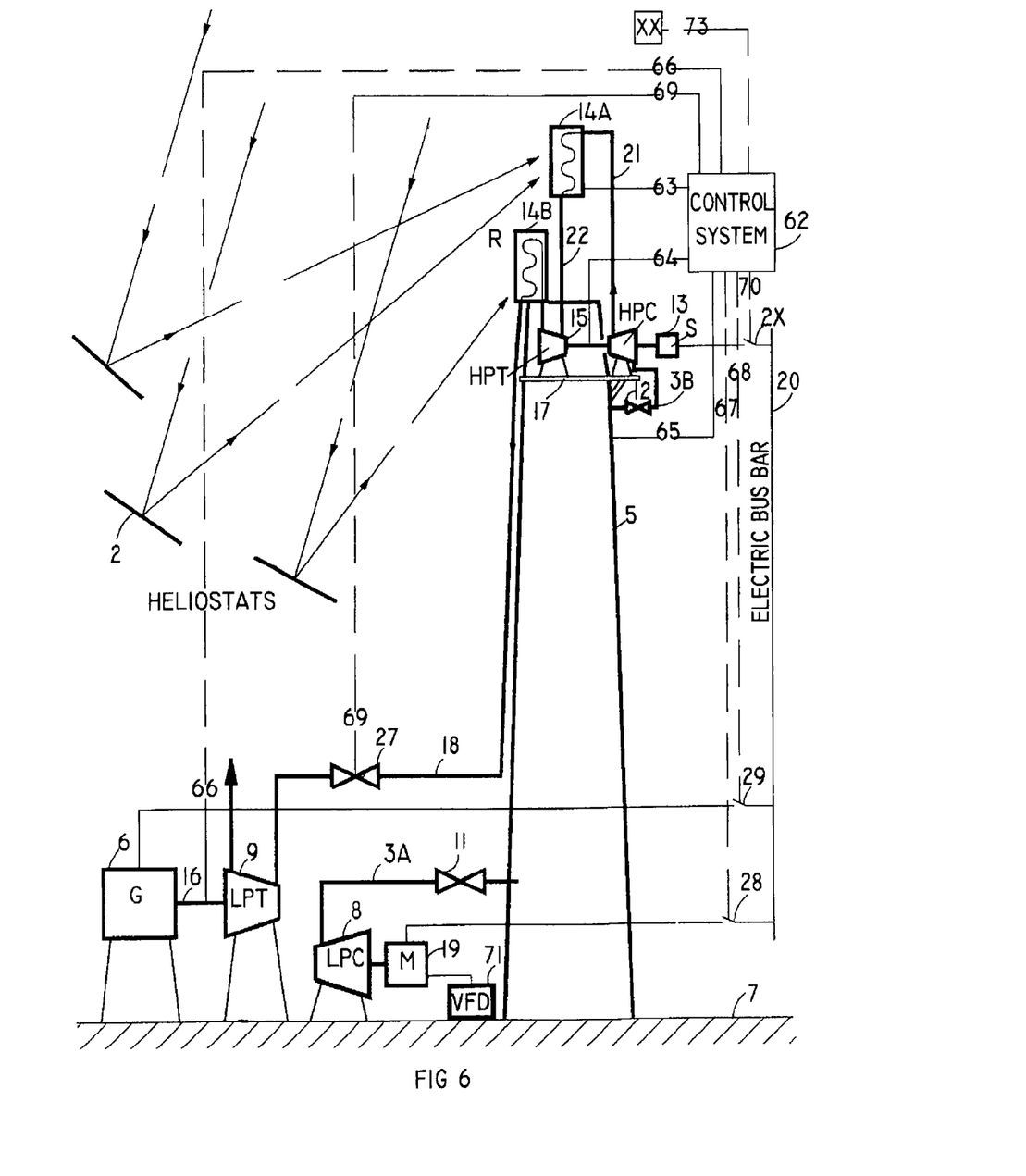
FIG. 6 is a schematic front view of a solar tower, showing the relative location of a first lower section and a second upper section of a solar power plant according to a further embodiment of the present invention.

Turning to FIG. 6, a further configuration of the present invention is shown. In this configuration an additional receiver 14B is included which improves the efficiency of LPT 9 achieving a higher power output. This additional receiver 14B is in addition to solar receiver 14A located between HPC 13 and HPT 15. Here, the air exiting of HPT 15 is reheated in e.g. the low temperature section of the receiver to increase LPT 9 power.

Figure 7:
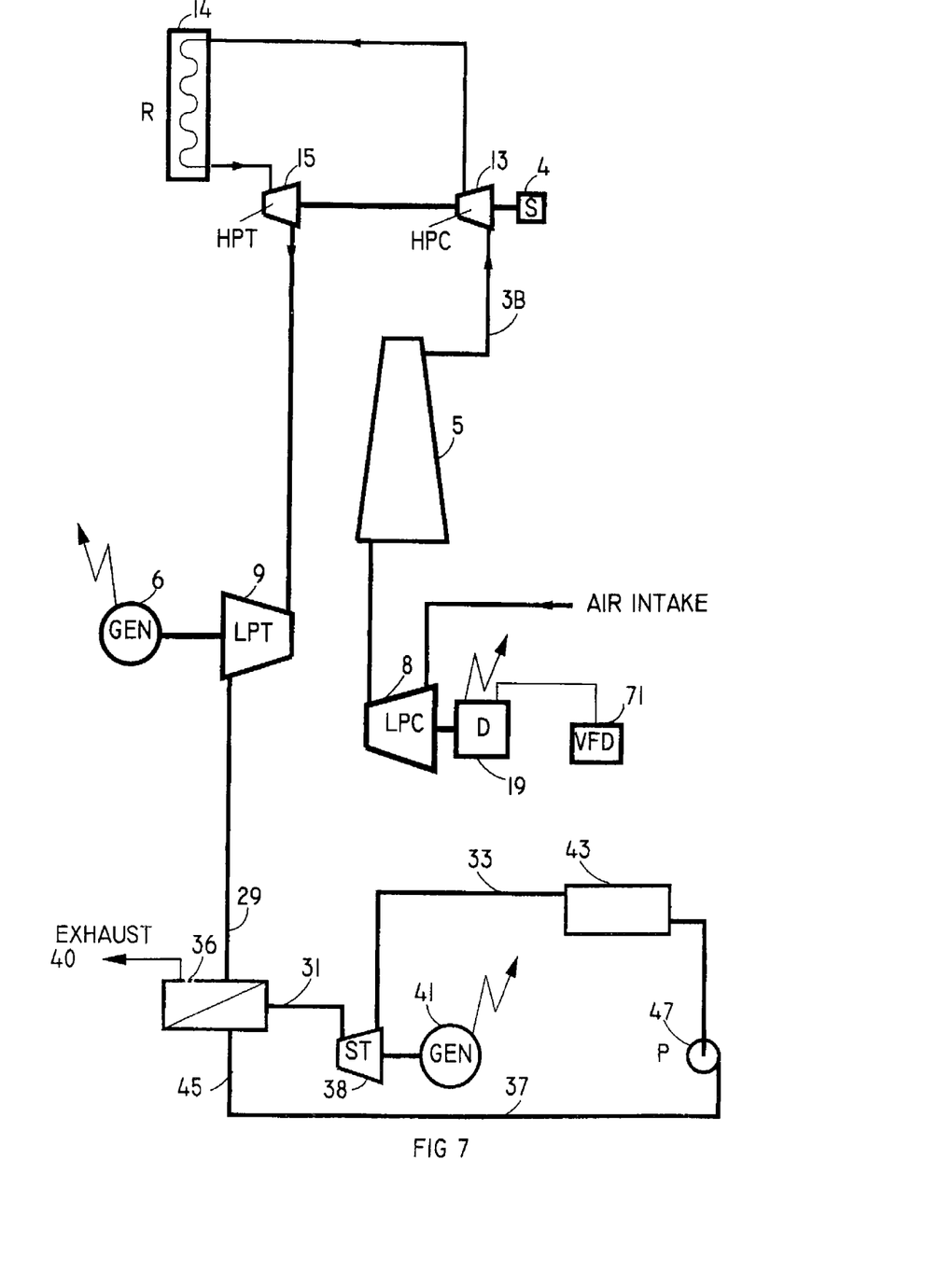
FIGS. 7 and 8 are schematic illustrations of a Brayton cycle solar power plants which further comprise a bottoming Rankine cycle power block according to another embodiment of the present invention.

FIG. 7 schematically illustrates power plant 40 operable in accordance with configuration of the present invention that employs supplementary bottoming Rankine cycle power block 40, where heat is transferred from the solar heated exhaust air to the motive fluid of the Rankine Cycle.

In a first configuration power block 45 shown, a bottoming steam Rankine cycle is provided. The hot exhaust air from the LPT is supplied via conduit 29 to a heat exchanger 36 (waste heat steam generator) which produces steam supplied via conduit 31 to steam turbine (ST) 38 driving generator (G) 41. The exhaust low pressure steam is transferred via conduit 33 to condenser (water or air cooled) 43. The condensate is pumped back to the boiler 36 via conduit 37 by condensate pump P 47.

Figure 8:
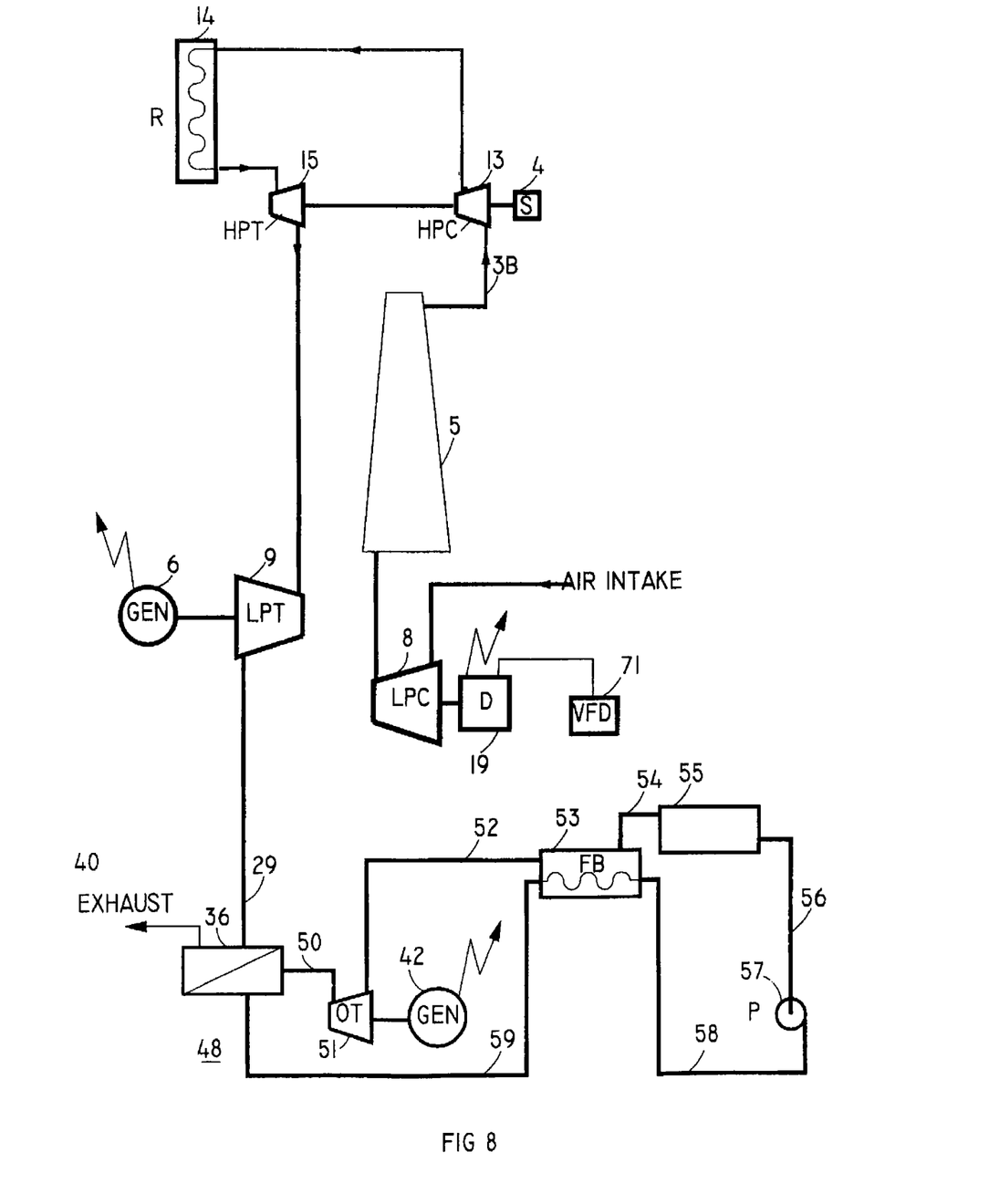

FIG. 8 shows a configuration of bottoming power block 48 based on an Organic Rankine Cycle (ORC).

In the present scenario, in addition to first lower section 7 and second upper section 17 (as described above), power plant 40 includes power block 48. The heat depleted air discharged from LPT 9 is supplied to heat exchanger (waste heat vapor generator) 49 via line 29. The heat depleted exhaust air from the heat exchanger 49 is then discharged to the atmosphere.

In the heat exchanger 49 organic fluid is vaporized. Vapor produced is supplied via conduit 50 to the vapor turbine OT 51 which drives generator 42 to produce additional power. The exhaust vapor is advantageously supplied to recuperator (FB) 53 via conduit 52 and from there via conduit 54 to condenser (air or water cooled) 55. The condensed fluid flows through pipe 56 to the feed pump (P) 57 and through pipe 58 to the recuperator where it recovers the sensible heat of the superheated exhaust vapor and is finally via piped back to the heat exchanger via conduit 59.

Figure 9:
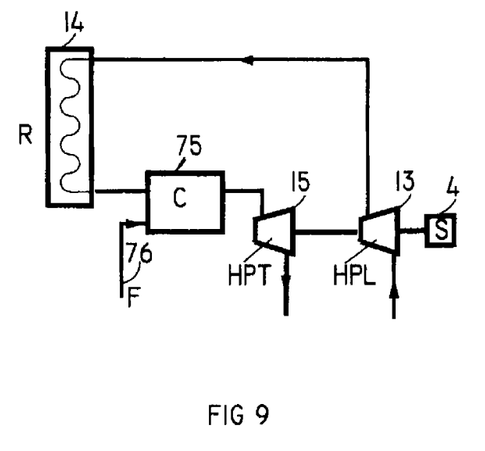
FIG. 9 shows a hybrid solar plant using both solar energy and fuel in a further embodiment of the present invention.

In the FIG. 9 option, solar power plant 40 is shown having combustion chamber 75 with fuel supply 76 for compensating the output drop during low solar radiation, or cloudy weather or at night or in peak demand periods. Fuels that can be advantageously combusted in the combustion chamber include natural gas, liquified petroleum gas (LPG), biogas, biodiesel, kerosene, diesel fuel or syngas.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A solar power plant, comprising:
a solar tower;
an array of heliostat mounted mirrors, a solar receiver and a high pressure section of a Brayton cycle power plant mounted near a top of the solar tower, and
a low pressure section of the said Brayton cycle power plant and an electric generator mounted at ground level, wherein the low pressure section of said Brayton cycle power plant mounted at ground level includes at least one of a low pressure compressor (LPC) and a low pressure turbine (LPT).

2. The solar power plant according to claim 1, wherein the Brayton cycle is a split Brayton cycle, and wherein the LPT drives said low pressure compressor and generator, and the high pressure section comprises a high pressure compressor (HPC) and a high pressure gas turbine (HPT).

3. The solar power plant according to claim 2, wherein air pressurized in a first stage by the low pressure compressor flows through a vertically tubular tower extending to the high pressure compressor where it is additionally pressurized in a second stage before supply to the receiver.

4. A solar power plant according to claim 3 wherein the well of said tower itself cools the compressed air by contact of the well of the tower with outside air.

5. The solar power plant according to claim 3, wherein the solar heated air exiting the solar receiver is delivered to the high pressure gas turbine for producing power for driving the high pressure compressor.

6. The solar power plant according to claim 5, wherein the air discharged from the high pressure gas turbine flows downward through a second insulated vertically line extending to the low pressure turbine for producing power using the electric generator mounted at ground level.

7. The solar power plant according to claim 1, further comprising a supplementary power block, wherein the air discharged from the low pressure gas turbine is supplied to a heat exchanger by which heat is transferred to motive fluid flowing in said supplementary power block from said air discharged from the low pressure gas turbine.

8. The solar power plant according to claim 7, wherein the air exiting said heat exchanger is discharged to the atmosphere.

9. The solar power plant according to claim 1 where the LPC compressor is driven by the LPT.

10. The solar power plant according to claim 1 where the LPC compressor is started using an electric motor obtaining power from the grid.

11. The solar power plant according to claim 1 where LPC compressor is started using an IC engine.

12. The solar power plant according to claim 1 where the LPC compressor is started by a pneumatic motor using stored compressed air.

13. The solar power plant according to claim 1 wherein the low pressure section comprises a low pressure compressor and a low pressure turbine driving a generator and wherein the LPC compressor is not connected to the LPT but driven by a variable speed electric motor whose speed is controlled to optimize the output of the system.

14. A solar power plant according to claim 2 where the HPC is started by an electric starter.

15. A solar power plant according to claim 2 where the HPC is started by the HPT using stored compressed air.

16. A solar power plant according to claim 2 comprising means for controlling said solar power plant in order to optimize its output.

17. A solar power plant according to claim 16 wherein said means for controlling said solar power plant includes means for controlling the speed of the LPC to adjust the pressure and density between the LPC and HPC so that the solar input is adjusted and the HPT and LPT are operated at optimum efficiency.

18. The solar power plant according to claim 3, further comprising first and second valves operatively connected to the first line for isolating the air pressurized in the first stage during periods of low solar influx onto the solar receiver for making the saved power available for short periods when the solar radiation is low.

19. A solar power plant according to claim 2 further comprising means for stopping the plant when the output is below a certain value so that to keep a sufficient amount of compressed air for quickly restarting when the temperature of the receiver reaches a predetermined value.

20. The solar power plant according to claim 1, further comprising a supplementary bottoming Rankine cycle power block, wherein the air discharged from the low pressure gas turbine is supplied to a heat exchanger by which heat is transferred to motive fluid flowing in said supplementary power block from said air discharged from the low pressure gas turbine.

21. The solar power plant according to claim 7 where the power block is a steam Rankine cycle plant.

22. The solar power plant according to claim 7 where the power block is an organic Rankine cycle power plant.

23. The solar power plant according to claim 1, wherein the solar receiver is mounted along substantially all sun facing portions near the top of the periphery surface of the solar tower.

24. The solar power plant according to claim 7, wherein the receiver is positioned above substantially all surrounding structures and landscape elements without suffering from significant obstruction or shading.

25. A solar power plant according to claim 2 further comprising a combustion chamber located between a receiver and the HPT for operation to compensate for lower solar radiation or at night or at peak demand.

26. A solar power plant according to claim 25 including means for supplying natural gas as fuel to said combustion chamber.

27. A solar power plant according to claim 25 including means for supplying LPG as fuel to said combustion chamber.

28. A solar power plant according to claim 25 including means for supplying biogas as fuel to said combustion chamber.

29. A solar power plant according to claim 25 including means for supplying biodiesel as fuel to said combustion chamber.

30. A solar power plant according to claim 25 including means for supplying kerosene as fuel to said combustion chamber.

31. A solar power plant according to claim 25 including means for supplying diesel fuel as fuel to said combustion chamber.

32. A solar power plant according to claim 25 including means for supplying syngas as fuel to said combustion chamber.

* * * * *